Patented Jan. 3, 1967

3,296,288
ORGANOMERCURY GROUP VB
METAL CARBONYLS
Kestutis A. Keblys, Southfield, and Michael Dubeck,
Royal Oak, Mich., assignors to Ethyl Corporation, New
York, N.Y., a corporation of Virginia
No Drawing. Filed Apr. 29, 1963, Ser. No. 276,198
13 Claims. (Cl. 260—429)

This invention relates to novel bimetallic compounds and to a process for preparing them. More specifically, this invention relates to a novel class of organomercury Group VB metal carbonyls and to their preparation from alkali and alkaline earth metal-etherate Group VB metal hexacarbonyls.

An object of this invention is to provide novel bimetallic compounds. Another object is to provide compounds which contain mercury and a Group VB metal. Another object is to provide a new class of Group VB metal carbonyls. A further object is to provide a process for the preparation of new Group VB metal carbonyl compounds which contain mercury. Additional objects will be apparent from the following discussion and claims.

The objects of this invention are accomplished by providing compounds which contain a univalent hydrocarbon radical, a mercury atom, a Group VB metal atom, and a plurality of carbonyl groups.

The compounds of this invention are organometallic compounds having the formula (I)        R—Hg—[M(CO)$_6$]

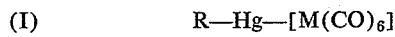

wherein M is a Group VB metal and R is a univalent hydrocarbon radical having from 1 to about 13 carbon atoms, said radical being selected from the class consisting of alkyl, cycloalkyl, aralkyl, alkenyl, cycloalkenyl, aryl and alkaryl radicals.

These compounds are prepared by a process comprising reacting a mercury compound having the formula (II)        R—HgX wherein X is halogen and R is a univalent hydrocarbon radical having from 1 to about 13 carbon atoms, said radical being selected from the class consisting of alkyl, cycloalkyl, aralkyl, alkenyl, cycloalkenyl, aryl and alkaryl radicals, with a metal carbonyl having the formula (III)        M$^1$(Et)$_y$M(CO)$_6$

wherein

M$^1$ is selected from the class consisting of alkali and alkaline earth metals and tetraalkyl ammonium, NR$_1$R$_2$R$_3$R$_4$, wherein R$_1$ to R$_4$ are independently selected from the class consisting of alkyl radicals having from 1 to about 6 carbon atoms, Et is an ether selected from the class consisting of non-cyclic bidentate and tridentate ethers;

y is an integer of value zero when M$^1$ is tetraalkyl ammonium, and having the value of 2 to 3 when M$^1$ is selected from the class consisting of alkali and alkaline earth metals, such that y=2 when Et is a tridentate ether, and y=3 when Et is a bidentate ether, and M is a Group VB metal atom;

said process being carried out in the presence of an inert organic solvent.

Although not bound by any theory, it is believed that the compounds of this invention have the structure illustrated below for the compound ethylmercuric tantalum hexacarbonyl.

(IV)        C$_2$H$_5$—Hg—Ta(CO)$_6$

In this formula, the organic radical R is bonded to a mercury atom which in turn is bonded to a tantalum atom. The tantalum atom is bonded to a plurality of carbonyl groups.

The mercury atom and the organic radical in the compounds of this invention are derived from the organomercury reactant, R—HgX. Organomercury halide compounds of all the halogens, organomercury acetates and nitrates, are applicable in this invention; however, the bromides, and especially the chlorides, are preferred since they are more readily available.

A wide variety of organomercurials of the type described above are applicable in the instant process provided that the organic radical is stable under the reaction conditions employed, is not so bulky as to unduly deter the process by steric hindrance, and does not render the halogen atom so non-reactive as to obviate the formation of the novel compounds.

Typically, the above criteria are satisfied by univalent hydrocarbon radicals; that is, radicals derived from organic compounds composed solely of carbon and hydrogen by extraction of one hydrogen atom. However, many radicals which contain atoms other than carbon and hydrogen are also applicable. For example, mercury reactants such as 2-pyrrolyl mercuric bromide and 2-furanyl mercuric chloride, are applicable in the instant process. When these compounds are reacted with a suitable tantalum hexacarbonyl according to the method of this invention, the products are 2-pyrrolyl mercuric tantalum hexacarbonyl and 2-furanylmercuric hexacarbonyl respectively. Similar vanadium and niobium compounds can also be prepared.

Moreover, many organomercury reactants containing radicals of the type described below, which are substituted with non-hydrocarbon substituents, are applicable in the instant process. For example, chloro and bromo-substituted hydrocarbon radicals are applicable, as are many hydroxy, alkoxy, cyano and keto-substituted radicals.

The R radical may be an alkyl derivative having a straight or branched chain. Illustrative but not limiting examples of radicals of this type are ethyl, isopropyl, sec-butyl, neopentyl and the like. Hence, when compounds such as isopropyl mercuric chloride and neopentyl mercuric chloride are reacted with a suitable vanadium hexacarbonyl compound according to the process of this invention, the products are isopropylmercuric vanadium hexacarbonyl and neopentylmercuric vanadium hexacarbonyl respectively. Moreover, R may be an alkenyl derivative. Typical alkenyl derivatives are isopropenyl, 4-hexenyl, allyl and the like. For example, when allyl mercuric chloride is reacted with an applicable niobium hexacarbonyl according to this process, the product is allyl mercuric niobium hexacarbonyl.

R may be an acyclic radical. Thus, R may be cyclohexyl, cyclopentyl, 2-cyclohexylethyl, and the like. Thus, cyclohexylmercuric bromide reacts with sodium bis(1,2-dimethoxyethane) niobium hexacarbonyl to yield cyclohexylmercuric niobium hexacarbonyl.

Furthermore, the cyclic radicals described and illustrated above may be substituted by aliphatic or aromatic substituents. Aralkyl radicals such as the phenylcyclohexenyl and phenylcyclohexyl radicals are non-limiting examples of this type. Illustrative examples of alkyl substituted alicyclic radicals are ethylcyclohexyl, dimethylcyclohexyl and the like. Thus, when phenylcyclohexyl mercuric bromide is reacted with an applicable tantalum compound according to this process, the product is phenylcyclohexylmercuric tantalum hexacarbonyl.

Aralkyl radicals such as the β-phenylethyl and β-phenylbutyl radicals are applicable in this invention. Compounds of this invention which comprise this type of radical are β-phenylethyl mercuric niobium hexacarbonyl, β-phenylethyl mercuric vanadium hexacarbonyl, β-phenylethyl mercuric tantalum hexacarbonyl and the like.

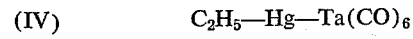

R may also be a univalent aromatic radical such as phenyl, biphenylyl, naphthyl and the like. Typical compounds of this invention having an aryl radical are phenyl mercuric vanadium hexacarbonyl, biphenylylmercuric niobium hexacarbonyl, and 2-naphthyl mercuric tantalum hexocarbonyl. The aromatic radicals may be substituted by alkyl radicals. Typical alkaryl radicals are 2,3-xylyl, p-cumenyl and the like. Hence, compounds such as o-methylphenyl mercuric tantalum hexacarbonyl and 3,5-diethylphenyl mercuric vanadium hexacarbonyl and the like are compounds of this invention which contain this type of radical.

The novel compounds of this invention are prepared by reacting an organomercuric halide of the type described above with an alkali or alkaline earth metal-ethrate Group VB metal hexacarbonyl. Group VB metal carbonyls of this type are described in copending application Serial No. 189,292, filed April 23, 1962, now U.S. Patent No. 3,214,452, and abandoned application Serial No. 80,543, filed January 4, 1961. These applications are incorporated by reference herein as if fully set forth.

The metal hexacarbonyl reactants have the structural formula indicated by Formula III above. They comprise a glycolether which is non-cyclic in structure. Typical bidentate ethers of this type have the formula

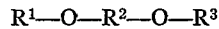

wherein $R^1$, $R^2$ and $R^3$ are independently selected from hydrocarbon radicals having from one to four carbon atoms. Illustrative but not limiting examples of these bidentate ethers include 1,2-dimethoxyethane, 1,3-dipropoxyethane, 1,2-dipropoxyethane, and the like.

Typical tridentate ethers within the Group VB metal carbonyl reactants employed in this process have the formula

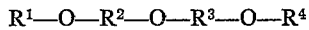

wherein $R^1$ to $R^4$ are hydrocarbon radicals having from 1 to 4 carbon atoms. Typical examples of these ethers include diethyleneglycol dimethylether, diethyleneglycol dibutylether, dipropyleneglycol dimethylether, dipropyleneglycol methylpropylether, dipropyleneglycol dibutylether, diethyleneglycol methylethylether and the like. A preferred tridentate ether is diethyleneglycol dimethylether.

The compounds of this invention are produced by contacting the reactants at reaction temperatures. A highly preferred temperature range is that which affords the greatest yield of desired product in the least reaction time. The process may be carried out at a temperature of from about −70 to about 50° C. The preferred temperature range is from about −40 to about 20° C. A most preferred temperature range is from about −10 to about 0° C.

The pressure employed in the process is not critical. Typically, the process is carried out at atmospheric pressure. However, pressures as low as .01 mm. to about 500 atmospheres or higher, may be employed. In many instances it is preferred that the reaction be carried out while blanketed by an inert gas such as nitrogen, neon or the like.

Although not essential, the process is conveniently carried out in the presence of an inert organic solvent. Typical reaction solvents that may be employed in this process are hydrocarbon solvents such as n-octane, n-decane, and other paraffinic hydrocarbons and mixtures thereof, such as No. 9 oil, kerosene and the like. Benzene, xylene, toluene and mixtures thereof are also applicable solvents. Typical ether solvents which are applicable in this invention include diethylether, dibutylether, diethyleneglycol dimethylether and the like.

The particular solvent employed in any embodiment of the process should be selected from those solvents having the requisite boiling and/or freezing point. Frequently, the boiling point of the solvent is used to control the reaction temperature by carrying out the process at the reflux temperature of the system. Moreover, the ease of separating the product from the solvent depends upon the degree of difference between the boiling and/or freezing points of the product and solvent. If the product is a liquid having a boiling point close to that of the solvent, separation of the product from the reaction mixture by distillation may be difficult. When liquid products are prepared, the preferred solvents have a boiling point about 25° C. higher than the product. If, on the other hand, the product is a solid, it is desirable that the freezing point of the solvent be at least 25° C. less than the temperature at which the product separates from the solvent by crystallization.

Although not essential, agitation of the reaction mixture is preferred. Stirring or rocking the reaction mixture affords enhanced contact of the reactants and, hence, an even reaction rate.

The process time is not a true independent variable but is at least partially dependent upon the other process conditions employed. Typically, the process of this invention can be carried out in a reaction time of from about 30 minutes to about 24 hours.

The following examples illustrate the process of this invention and the products produced thereby. All parts are in parts by weight unless otherwise indicated.

Example I

A solution of 1.08 parts of ethyl mercuric chloride in 48 parts of benzene was added dropwise at room temperature to a stirred mixture of 2.61 parts of sodium tris(1,2-dimethoxyethane) tantalum hexacarbonyl in 12 parts of benzene. The reaction mixture turned red and the addition was complete in one hour. The resultant reaction mixture was stirred for an additional 30 minutes. The reaction mixture was filtered to remove a brown residue and the red filtrate was evaporated to dryness in vacuo. A dark maroon solid, 1.85 parts, was obtained. This solid was insoluble in water.

A portion of the crude solid product was sublimed at 0.2 mm. at 30–45° C. A red crystalline solid condensed on the cold finger.

The sublimate melted at 65–66° C. with partial decomposition under nitrogen. Upon further heating, the compound decomposed completely at 70–80° C. to a black solid.

The red crystalline sublimate was moderately stable in air, i.e., no change in 15 minutes. However, it partially decomposed when left at room temperature overnight. The product was stable at −10° C. under nitrogen or carbon monoxide.

The infrared spectrum of the sublimed product in benzene solution had peaks at 4.80, 5.05 (broad) and 5.20 microns. Emission spectroscopy demonstrated that the compound contained mercury.

The red crystalline sublimate was submitted for microanalysis. Calculated for $EtHgTa(CO)_6$: C, 16.6; H, 0.87; Ta, 31.2; Hg, 34.6. Found: C, 16.4; H, 1.14; Ta, 31.2; Hg, 34.5.

The compound was soluble in petroleum ether, ethyl, chloroform, and methylene chloride. On the basis of the above evidence, the product was identified as ethyl mercuric tantalum hexacarbonyl.

The reaction was repeated using 4.07 parts of sodium tris(dimethoxyethane) tantalum hexacarbonyl and 1.68 parts of ethyl mercuric chloride. The product, ethylmercuric tantalum hexacarbonyl, was identical to that obtained in the above reaction.

Example II

Sodium tris(1,2-dimethoxyethane) tantalum hexacarbonyl, 4.14 parts, and 2.02 parts of ethylmercuric chloride, were reacted in ether solution at 0° C. as in Example I. The reaction mixture was filtered and the red filtrate was evaporated at −20° C. The resultant red crystalline residue was recrystallized from petroleum ether. Ethyl mercuric tantalum hexacarbonyl, 2.17 parts, was obtained.

*Example III*

Sodium tris(1,2-dimethoxyethane) tantalum hexacarbonyl, 2.90 parts, and 1.41 parts of phenylmercuric chloride were added to a suitable reaction vessel and the vessel and contents cooled to −20° C. Thereafter, 35 parts of ether was added dropwise over a period of one hour. The reaction mixture was then stirred for two hours at −20±5° C. and for an additional three and one-half hours at 0±5° C. Thereafter, the reaction mixture was filtered into a vessel previously cooled to −70° C. The filtrate comprised an orange-red solution and the residue was a red-brown crystalline material. The residue was extracted with about 28 parts of ether and the extract combined with the filtrate.

The combined extracts and filtrate were cooled to −76° C. whereupon copper-red crystals were deposited. The supernatant combined extract and filtrate was removed by siphoning. The crystals were collected by filtration and were washed with about 8.4 parts of ether at −70° C. and then dried in vacuo at −30° C. The crystals were then extracted with petroleum ether at −10° C. to 0° C. The petroleum ether solution was concentrated by evaporation at −20° C. and then cooled in Dry Ice. A dark red solid crystallized. The supernatant solution was removed by siphoning and the dark-red crystals were washed with petroleum ether at −76° C. and dried in vacuo at −30° C.

The infrared spectrum of the dark-red crystalline solid, phenylmercuric tantalum hexacarbonyl, had bands at 4.80, 4.85, 5.05 (broad) and 5.20 microns. The band at 4.85 microns increased with time at the expense of the 4.80 micron band.

The product was thermally unstable; a sample under nitrogen partially decomposed at room temperature within five minutes. Because of the instability, no microanalysis of the product could be carried out.

*Example IV*

Following the procedure of Example I, isopropyl mercuric chloride is reacted with sodium tris(dimethoxyethane) vanadium hexacarbonyl. The product is isopropyl mercuric vanadium hexacarbonyl. Similar results are obtained when sodium bis(diethyleneglycol dimethylether) vanadium hexacarbonyl, sodium bis(diethyleneglycol dibutylether) vanadium hexacarbonyl, potassium bis(dipropyleneglycol methylpropylether) vanadium hexacarbonyl, sodium bis(dipropyleneglycol dibutylether) vanadium hexacarbonyl, sodium bis(diethyleneglycol methylethylether) vanadium hexacarbonyl, and sodium tris(1,3-dimethoxypropane) vanadium hexacarbonyl are employed in the process.

*Example V*

Following the procedure of Example II, allyl mercuric bromide is reacted with the calcium 1,2-dimethoxypropane salt of niobium hexacarbonyl at 50° C. for about one hour. The product is allyl mercuric niobium hexacarbonyl. Similar results are obtained when benzene, n-nonane, petroleum ether, and kerosene are employed as solvents in the process.

*Example VI*

Cyclohexyl mercuric bromide is reacted with the magnesium 1,2-dipropoxyethane salt of niobium hexacarbonyl at −20° C. The product is cyclohexyl mercuric niobium hexacarbonyl. Similarly, 2-cyclohexenyl mercuric chloride yields 2-cyclohexenyl mercuric niobium hexacarbonyl.

*Example VII*

2-naphthyl mercuric bromide is reacted with sodium tris(dimethoxyethane) tantalum hexacarbonyl at −40° C. The reactants are stirred in a dibutylether solution for 10 hours. The product is 2-naphthyl mercuric tantalum hexacarbonyl. Similarly, biphenylyl mercuric chloride reacts with sodium tris(dimethoxyethane) tantalum hexacarbonyl to yield biphenylyl mercuric tantalum hexacarbonyl.

*Example VIII*

β-Phenylethyl mercuric chloride is reacted with the potassium dipropyleneglycol methylpropylether salt of niobium hexacarbonyl for 15 hours at −5° C. The product is β-phenylethyl mercuric niobium hexacarbonyl. Similarly, 2,3-xylylmercuric chloride reacts with sodium bis(dipropyleneglycol methylpropylether) niobium hexacarbonyl to yield 2,3-xylylmercuric niobium hexacarbonyl.

*Example IX*

2-thiophenyl mercuric bromide reacts with sodium bis(dipropyleneglycol dimethylether) hexacarbonyl vanadate when the reactants are dissolved in an ether solution and refluxed for one-half hour. The product is 2-thiophenylmercuric vanadium hexacarbonyl.

*Example X*

Cycloheptatrienyl mercuric bromide is reacted with sodium tris(dimethoxyethane) tantalum hexacarbonyl for 48 hours at −70° C. The product is cycloheptatrienyl mercuric tantalum hexacarbonyl.

*Example XI*

3-cyanophenyl mercuric acetate is reacted with tetra-n-hexyl ammonium hexacarbonyl vanadate by refluxing a diethylether solution of the reactants for about one-half hour. The product is 3-cyanophenyl mercuric vanadium hexacarbonyl. Similarly, 3-chlorophenyl mercuric bromide, 3-methoxyphenyl mercuric nitrate, and 3-nitrophenyl mercuric chloride react with tetraethylammonium niobium hexacarbonyl to yield 3-chlorophenyl merucric niobium hexacarbonyl, 3-methoxyphenyl mercuric niobium hexacarbonyl and 3-nitrophenyl mercuric niobium hexacarbonyl respectively.

Similarly, methyl 3-chloromercury benzoate reacts with N,N-diethyl N,N-dimethyl ammonium tantalum hexacarbonyl to yield 3-carbomethoxyphenyl mercuric tantalum hexacarbonyl.

*Example XII*

Di(chloromercury) ferrocene reacts with sodium bis(diethyleneglycol dimethylether) tantalum hexacarbonyl to yield bis(mercuric tantalum hexacarbonyl cyclopentadienyl) iron. Similarly, chloromercury cyclopentadienyl manganese tricarbonyl reacts with sodium bis(diethyleneglycol dimethylether) tantalum hexacarbonyl in ether solution at 50° C. to form cyclopentadienyl (manganese tricarbonyl) mercuric tantalum hexacarbonyl.

Examples IX, XI, and XII above demonstrate that the exact structure of the organo radical bonded to the mercury atom is not critical and that any radical stable under the reaction conditions employed, which does not unduly deactivate the reactant, is applicable.

The process of this invention can be extended to other metals such as the Group IIIA and IVA elements. Hence, aluminum-Group VB metal compounds and tin-Group VB metal compounds can be prepared by reacting alkali or alkaline earth metal etherate Group VB metal hexacarbonyls with organoaluminum halides and organotin halides respectively. Organoaluminum and organotin compounds containing radicals similar to those in the organomercury reactants are applicable.

For example, when tributyltin chloride was reacted with sodium tris(1,2-dimethoxyethane) tantalum hexacarbonyl in benzene, the reaction mixture immediately turned red and the tantalate went into solution. The product, tributyltin tantalum hexacarbonyl, has an infrared spectrum having bands at 4.95, 5.10 and 5.25 microns.

Following the same procedure, dialkylaluminum compounds of Group VB metal hexacarbonyls, such as di-n-propylaluminum tantalum hexacarbonyl, can be prepared.

The products of this invention are valuable chemical intermediates. Moreover, they are valuable sources of metal carbides and are useful as metal plating agents. For example, ethyl mercuric tantalum hexacarbonyl was decomposed in vacuo (2 to 5 microns of mercury) at a temperature within the range of 47–51° C. The resultant vapors were directed to a heated surface and tantalum carbide resulted. Tantalum carbide is useful as a refractory material and as an abrasion agent in cutting tools.

When dialkyl aluminum tantalum hexacarbonyls are decomposed in vacuo and the vapors impinged upon a heated metal surface, the metal surface is coated with an aluminum-tantalum alloy which is highly resistant to oxidation at elevated temperatures and also resistant to attack by many acids and alkalis.

The compounds of this invention are useful as additives for lubricants and petroleum fuels. Fuel compositions containing up to about 15 grams of tantalum as a mercury tantalum compound of this invention have enhanced properties when utilized in internal combustion engines.

Moreover, many of the compounds of this invention are useful as medicinals and many have biocidal properties and can be employed as fungicides and herbicides.

Having fully described the novel compounds of this invention, their mode of preparation, and their many utilities, it is desired that this invention be limited only within the lawful scope of the appended claims.

We claim:
1. Organometallic compounds having the formula

$$R—Hg—[M(CO)_6]$$

wherein M is a Group VB metal and R is a univalent hydrocarbon radical having from 1 to about 13 carbon atoms, said radical being selected from the class consisting of alkyl, cycloalkyl, aralkyl, alkenyl, cycloalkenyl, aryl and alkaryl radicals.

2. A compound of claim 1 wherein R is an alkyl radical.
3. A compound of claim 1 wherein R is an aryl radical.
4. A compound of claim 1 wherein M is tantalum.
5. Ethyl mercuric tantalum hexacarbonyl.
6. Phenyl mercuric tantalum hexacarbonyl.
7. Process for the preparation of an organometallic compound having the formula $$R—Hg—[M(CO)_6]$$

said process comprising reacting a mercury compound having the formula $$R—HgX$$

wherein X is halogen and R is a univalent hydrocarbon radical having from 1 to about 13 carbon atoms, said radical being selected from the class consisting of alkyl, cycloalkyl, aralkyl, alkenyl, cycloalkenyl, aryl and alkaryl radicals; with a metal carbonyl having the formula $$M^1(Et)_yM(CO)_6$$

wherein $M^1$ is selected from the class consisting of alkali and alkaline earth metals and tetraalkyl ammonium, $NR_1R_2R_3R_4$, wherein $R_1$ to $R_4$ are independently selected from the class consisting of alkyl radicals having from 1 to about 6 carbon atoms, Et is an ether selected from the class consisting of non-cyclic bidentate and tridentate ethers;

y is an integer of value zero when $M^1$ is tetraalkyl ammonium, and having the value of 2 to 3 when $M^1$ is selected from the class consisting of alkali and alkaline earth metals, such that $y=2$ when Et is a tridentate ether, and $y=3$ when Et is a bidentate ether, and M is a Group VB metal atom;

said process being carried out in the presence of an inert organic solvent.

8. The process of claim 7 being carried out at a temperature from about −70 to about 50° C.
9. The process of claim 7 wherein said organomercury compound is ethylmercuric chloride.
10. The process of claim 7 wherein said organomercury compound is phenylmercuric chloride.
11. The process of claim 7 wherein said metal carbonyl is sodium bis(1,2-dimethoxyethane) tantalum hexacarbonyl.
12. A process for the preparation of ethylmercuric tantalum hexacarbonyl, said process comprising reacting ethylmercuric chloride with sodium bis(1,2-dimethoxyethane) tantalum hexacarbonyl in ether.
13. A process for the preparation of phenylmercuric tantalum hexacarbonyl, said process comprising reacting sodium tris(1,2-dimethoxyethane) tantalum hexacarbonyl with phenylmercuric chloride in ether.

No references cited.

HELEN M. McCARTHY, *Primary Examiner.*

H. M. S. SNEED, *Assistant Examiner.*